Patented July 7, 1931

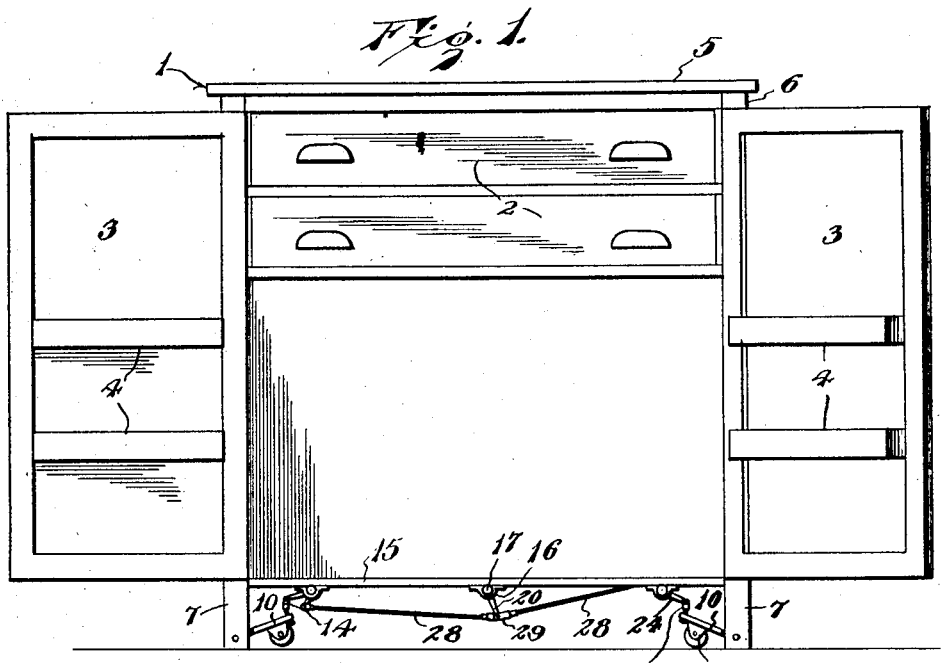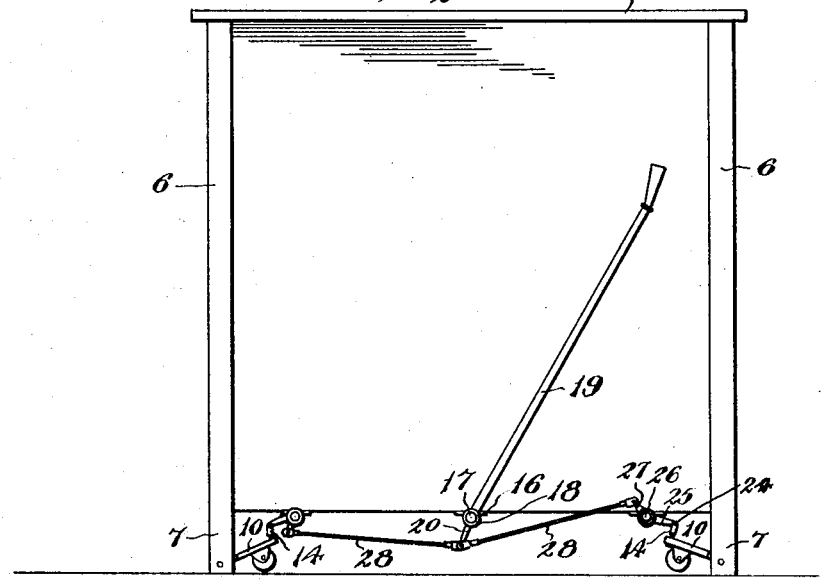

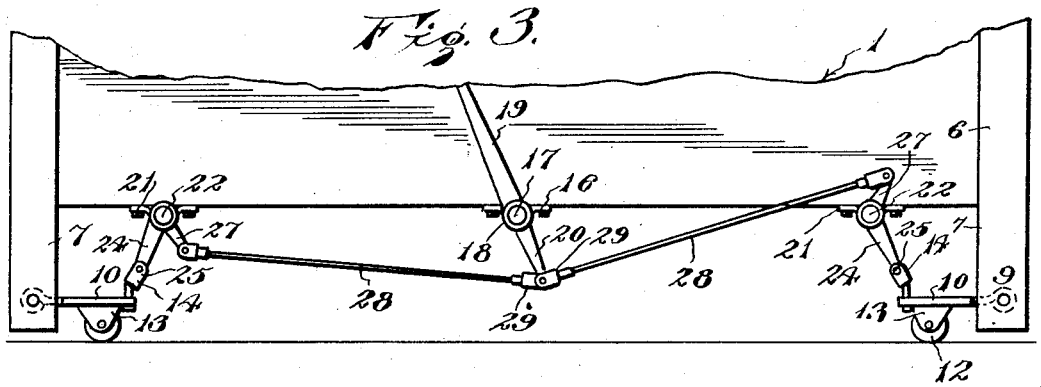

1,812,890

UNITED STATES PATENT OFFICE

ALLIE E. McWHORTER, OF TAFT, TEXAS

COMBINED TOOL CABINET AND WORKBENCH

Application filed September 13, 1928. Serial No. 305,859.

The present invention is directed to improvements in combined tool cabinets and work benches.

The primary object of the invention is to provide a device of this character so constructed that tools required by an automobile mechanic will be arranged for convenient access.

Another object of the invention is to provide a device of this character so constructed that it can be conveniently moved from place to place, novel means being provided whereby the cabinet can be elevated and rollers engaged with the floor to permit convenient transportation of the cabinet from place to place.

Another object of the invention is to provide a device of this character which is formed from suitable sheet metal in order that it will stand hard usage, and the top thereof can be conveniently employed as a work bench.

With these and other objects in view, this invention resides in the novel features of construction, formation, combination and arrangement of parts to be hereinafter more fully described, claimed and illustrated in the accompanying drawings, in which:—

Figure 1 is a front view of the device, the doors being open.

Figure 2 is a rear elevation of the device.

Figure 3 is a fragmentary rear view showing the rollers engaged with the floor and the cabinet elevated.

Figure 4 is a bottom plan view.

Figure 5 is a detail view showing the mounting of the clevises of the plates.

Referring to the drawings, 1 designates the cabinet which is provided with drawers 2 and doors 3, said doors having pockets 4 carried thereby in which cotter pins and lock washers may be placed. The top 5 of the cabinet may be used as a work bench and is formed from rather stout sheet metal to withstand hard usage.

The cabinet further includes corner posts 6 and legs 7, which may be secured to the cabinet in any approved manner. The legs of each pair are provided with bearings 8 in which are engaged the ends of the rods 9, said rods being pivotally connected to the elongated plates 10. These plates have formed adjacent their ends openings 11 in which are located rollers 12, said rollers being rotatably supported by the flanges 13. Each plate is provided with a centrally located clevis 14, having a bolt 12' threaded therein for pivotally and slidably engaging the slot 13' of the plate 10.

The bottom 15 of the cabinet is provided with a pair of oppositely disposed bearings 16 for rotatably supporting the centrally located transversely disposed shaft 17, said shaft having fixed to its rear end a collar 18 formed upon the lower end of the actuating lever 19, said collar having a depending arm 20 carried thereby.

Disposed upon opposite sides of the bearings 16 are bearings 21—21 which are secured to the bottom 15 of the cabinet and in which are journaled the ends of the shafts 22—22, said shafts having fixed thereon collars 23—23 which carry arms 24—24, said arms being pivotally connected to the clevises 14, as at 25, in order that when the shafts 22—22 are rotated the plates will be moved into or out of operative position.

The rear ends of the shafts 22—22 have fixed thereon collars 26 provided with arms 27 which are pivotally connected to the outer ends of the links 28, the inner ends of said links having clevises 29 thereon which are pivotally connected to the arm 20 of the lever 19, as clearly shown in Figure 4.

As shown in Figures 1 and 2 the legs 7 of the cabinet are resting upon the floor and at which time the rollers 12 are elevated in order that the bench and cabinet will be firmly held against movement. When it is desired to move the cabinet the lever is swung to the position as shown in Figure 3 of the drawings, whereupon the plates 10 swing downwardly so that the rollers will engage the floor. When the lever is in this position the arms 24 and clevises 14 will be in alignment, thus holding the plates against accidental swinging, the parts remaining in this position until the lever is swung in a reverse direction.

The rollers 12 are illustrated as being pivotally connected to the flanges 13, but it will be of course understood that caster wheels can be substituted for these rollers.

The entire cabinet is preferably formed from sheet metal in order that it will withstand hard usage, and the top is of stout sheet metal so that the same can be used as a work bench.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

1. The combination with a cabinet, of elevating and lowering means therefor comprising a pivoted member provided with a supporting roller, a pivoted arm, a clevis pivoted to said arm, a pivotal and sliding connection between the clevis and the beforementioned pivoted member, and an operating member connected with the said pivoted arm.

2. The combination with a cabinet, of elevating and lowering means therefor comprising a plate pivoted at one side thereto and provided adjacent its ends with supporting rollers, a shaft paralleling the plate, an arm rigid with the shaft, a clevis pivoted to the arm, a pivotal and sliding connection between said clevis and plate, and an operating member connected with the shaft to effect a pivotal movement of the plate and a raising and lowering of the supporting rollers.

3. The combination with a cabinet provided with legs, of supporting rollers at the sides of the cabinet pivotally connected thereto, an intermediate and side shafts, an arm projecting from each side shaft, a clevis pivoted to each of the arms, a pivotal and sliding connection between the clevis and the respective supporting rollers, connecting means between the intermediate and side shafts, and an operating lever mounted upon the intermediate shaft.

4. The combination with a cabinet provided with legs, of plates pivoted to the respective side legs and provided at their ends with supporting rollers, shafts paralleling the plates, connecting means between the shafts and plates to admit of the latter having a pivotal movement, an intermediate shaft, arms projecting from the several shafts, links connecting the respective arms, and an operating lever mounted upon the intermediate shaft.

In testimony whereof I affix my signature.

ALLIE E. McWHORTER. [L. S.]